(12) United States Patent
Tas

(10) Patent No.: US 11,656,986 B2
(45) Date of Patent: May 23, 2023

(54) DISTRIBUTED GENERIC CACHEABILITY ANALYSIS

(71) Applicant: Google LLC, Mountain View, CA (US)

(72) Inventor: Nazif Cihan Tas, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/407,594

(22) Filed: Aug. 20, 2021

(65) Prior Publication Data

US 2023/0054017 A1 Feb. 23, 2023

(51) Int. Cl.
*G06F 12/08* (2016.01)
*G06F 12/0802* (2016.01)

(52) U.S. Cl.
CPC .. *G06F 12/0802* (2013.01); *G06F 2212/1021* (2013.01)

(58) Field of Classification Search
CPC .............. G06F 12/0802; G06F 2212/1021
See application file for complete search history.

(56) References Cited

U.S. PATENT DOCUMENTS

| 10,095,624 | B1 * | 10/2018 | Visvanathan ....... G06F 12/0862 |
| 10,114,751 | B1 | 10/2018 | Faith et al. |
| 2003/0208665 | A1 | 11/2003 | Peir et al. |
| 2005/0268037 | A1 | 12/2005 | Hama et al. |

FOREIGN PATENT DOCUMENTS

| EP | 1835409 A2 | 9/2007 |
| WO | 9502864 A1 | 1/1995 |

OTHER PUBLICATIONS

Extended European Search Report for European Patent Application No. 22156105.3 dated Jun. 28, 2022. 15 pages.

* cited by examiner

*Primary Examiner* — Jae U Yu
(74) *Attorney, Agent, or Firm* — Lerner David LLP

(57) ABSTRACT

A technology for estimating one or more cache hit rates. An implementation includes receiving a request-response pair, calculating a fingerprint for the request-response pair, storing the fingerprint, and determining whether the fingerprint is a member of a bloom filter.

12 Claims, 6 Drawing Sheets

DISTRIBUTED GENERIC CACHEABILITY ANALYSIS

BACKGROUND

In computer science, "caching" refers to the storing data in a hardware or software component so that future requests for the data can be served faster. A "cache hit" occurs when requested data can be found in a cache.

Caching comes with many advantages, including reduced backend load (as a capacity cache) and better user experience through reduced latency (as a latency cache). A big challenge in deploying a caching layer is to estimate beforehand how cacheable a request-response pair is, which then dictates the expected cache hit rate when the caching layer is in place. If wrong assumptions are made, the resulting caching layer might be ineffective, rendering the cache efforts and resources useless. Further, a bad caching layer estimate might cause a service provider to miss an opportunity to deploy a cache which would be very effective.

BRIEF SUMMARY

It has been recognized that there is a need for technology that can efficiently and accurately provide cache estimates. In this regard, how cacheable an item is will be referred to as "cacheability" of the item.

Accordingly, the technology of the present disclosure allows for efficient and accurate estimation of the cacheability of a remote procedure call (RPC) endpoint, the cacheability of the RPC being defined by the number of identical request-response pairs served within a bounded time interval. The technology provides a tool that automatically and seamlessly reports on cacheability.

In one aspect, the technology provides a method for a method for estimating one or more cache hit rates, the method including receiving a request-response pair; incrementing a cached item count; calculating a fingerprint for the request-response pair; determining whether the fingerprint is a member of a bloom filter, and when the fingerprint is a member of the bloom filter incrementing a local hit count; repeating the steps of receiving, incrementing, calculating, and determining for a cacheability analysis period; and estimating a local cache hit rate based on the item count and the local hit count.

In another aspect, the technology provides a method for estimating one or more cache hit rates, the method including receiving a request-response pair; incrementing an item count; calculating a fingerprint for the request-response pair and storing the fingerprint in a first storage; determining whether the fingerprint is a member of a current bloom filter, when the fingerprint is a member of the current bloom filter, incrementing a local hit count, and when the fingerprint is not a member of the current bloom filter, determining whether the fingerprint is a member of an other bloom filter, when the fingerprint is a member of the other bloom filter, adding the fingerprint to the current bloom filter, and adding the fingerprint to a second storage, and when the fingerprint is not a member of the other bloom filter determining whether the current bloom filter has space for the fingerprint, when the current bloom filter has space for the fingerprint adding the fingerprint into the current bloom filter, and when the current bloom filter does not have space for the fingerprint, clearing the other bloom filter and then moving the contents of the current bloom filter to the other bloom filter; repeating the steps of receiving, incrementing, calculating, and determining for a cacheability analysis period; estimating a cache hit rate based on at least the item count.

In still another aspect, the technology provides a system for a system for providing an estimate of one or more cache hit rates, the system including a device for receiving metrics from i tasks, wherein i is an integer greater than or equal to one, and using the metrics to calculate an estimate of one or more cache hit rates.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Figure 1:
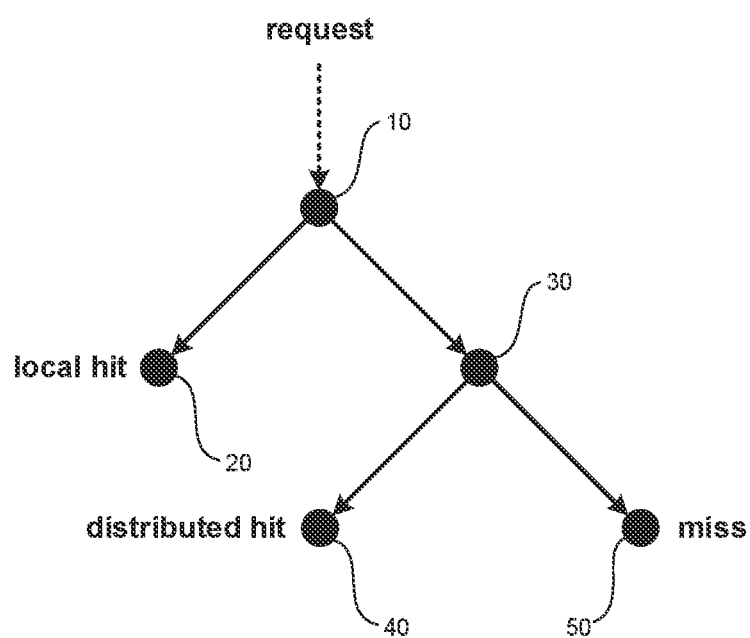
FIG. 1 is an operational flow diagram showing how a data request may move through the caching layers provided for a task.

Examples of systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

The presently disclosed technology provides a simple, lightweight, and maintenance-free local and distributed cacheability estimation. The technology is scalable and built on already existing data collection and processing infrastructures. The technology is (1) lightweight—the required memory/computational resources are minimal, (2) nonintrusive—the cacheability analysis does not impact the request/response behavior in any way, and there is no additional latency for serving and no impact in case of any types of failure due to the introduced mechanism, (3) generic—supports multiple/any RPC endpoints, and (4) multifaceted—applicable to both local (single task) scenarios and distributed (single task or multi-task) scenarios. Further the technology does not require real-time data and realizes simplicity and efficiency by estimating certain parameters rather than calculating such parameters. The cacheability analysis of the technology is said to be acceptable as long as the expected error associated with the analysis can be calculated and is within certain accuracy boundaries (e.g., x % cache hit/miss rate error is generally acceptable).

The present technology employs two mathematical constructs to realize greater simplicity and efficiency, the bloom filter and the hyperloglog algorithm. Accordingly, before providing a detailed description of the technology, bloom filters and the hyperloglog algorithm will be discussed in general.

Bloom Filters

Bloom filters are space-efficient probabilistic data structures that are used to test whether an element is a member of a set. A bloom filter consists of a bit array of m bits (initialized all to 0) and k different hash functions. When an element is added to the set, it is fed into each of the k hash functions to get k array positions. Subsequently, the bits at all these positions are set to 1. Similarly, in order to check if an element is a member of the bloom filter, it is sufficient to calculate the k bit locations for this new element and check if all of those bits are set to 1. If there is at least one unset bit, one can conclude that the element is not a member of the set. If all the bits are set, however, there is a possibility that the bits were set due to the insertion of previous elements. Thus, bloom filters are guaranteed to have no false negatives whereas false positives are possible. However, the probability of false positives can be calculated, and a target probability of false positives can be achieved through tuning the bloom filter size and the number of hash functions to be used. Advantageous properties of bloom filters include:

(1). A bloom filter's probability of false positive rate can be calculated, and it is equal to $(1-e^{-kn/m})^k$
where n is the number of elements. This is a lower bound, but for large m and small k, the difference between this approximation and the actual false positive rate is negligible. Similarly, the relative error diminishes with the larger m ($\geq 1024$ bits).

(2). The number of elements in a bloom filter A also can be approximated with the following formula $$\gamma(A)=-m/k \ln(1-X/m)$$

where X is the number of bits set to 1.

(3). The bloom filters support set union operation. When taking the union of two filters, it is sufficient to bitwise OR the two sets.

(4). The size of the intersection of two bloom filters (A and B) can also be calculated through using (2) and (3) above $$\gamma(A \cap B)=\gamma(A)+\gamma(B)-\gamma(A \cup B)$$

Deletions in bloom filters are not supported as multiple elements contribute to setting bits in the same locations. Hence, they are not immediately usable for emulating caches, which would require deletes for cache eviction. In the presently disclosed technology, a variant of bloom filters is used to overcome this limitation.

HyperLogLog Algorithm

HyperLogLog is a probabilistic algorithm which can be used to estimate the cardinality (i.e., the distinct element count) of a set within an error bound. The main logic behind HyperLogLog is that the cardinality of a multiset of uniformly distributed random numbers can be estimated by calculating the maximum number of leading zeros in the binary representation of each number in the set. HyperLo-gLog splits the original set into multiple subsets, calculating the maximum number of leading zeros in the numbers in each of these subsets and taking the average to reduce the variance of the results. The relative error for the cardinality estimation of the HyperLogLog algorithm is $1.04/\sqrt{m}$ where m is the number of subsets (i.e., buckets).

Having described bloom filters and the hyperloglog algorithm in general, the present disclosure's cacheability analysis, which makes use of bloom filters and hyperloglog, will now be described in detail.

The cacheability analysis is performed for a bounded time. During the bounded time, the analysis may model the performance of a task's local cache (e.g., a service's local cache or a server's local cache) using a bloom filter and model the performance of a distributed cache serving a plurality of tasks using a combination of the bloom filter and hyperloglog operations. The performance models may be used to provide an estimate of cache hit rates for requests flowing through a layered cache as described in FIG. 1.

FIG. 1 is an operational flow diagram showing how a data request may move through the caching layers provided for a task. As can be seen from the figure, a request may be received by a task (operation node 10) and may be served with a response present in a local cache for the task, in which case the request results in a local hit (operation node 20). If the request cannot be served from the local cache (operation node 30), it may be served with a response present in a distributed cache that is associated with the task, in which case it is a distributed hit (operation node 40). If the request cannot be served from the local cache or the distributed cache, it is a miss (operation node 50).

The cacheability analysis of present disclosure examines request-response pairs. That is, the analysis involves observing request-response pairs and comparing request-response pairs to determine if a request-response pair repeats. Thus, if is assumed that all responses are cached for a bounded time then, for the bounded time, if a request-response pair is observed more than once each observance after the first observance is said to be a cache hit.

In order to compare two request-response pairs to answer the question of whether a task served the same response to the same request, the fingerprint of each request-response pair is calculated by hashing them together as follows:

Fingerprint(req,rep)=hash({req,resp,custommeta-data})

for a given request and response. Hence, if the fingerprints of two request-response pairs match, it is assumed that the second request could have been served from the cache (if there was one in place). Depending on the server characteristics, a custommetadata can also be added to the fingerprint. For example, the metadata can be a form of user credentials, or an arbitrary hash salt. There is also support for injecting the fingerprint directly from the server code in order to support the use case of memcached. This is useful for service owners who are planning to deploy a cacheserver in order to serve partial responses and want to verify the performance of their planned cache.

Figure 2:
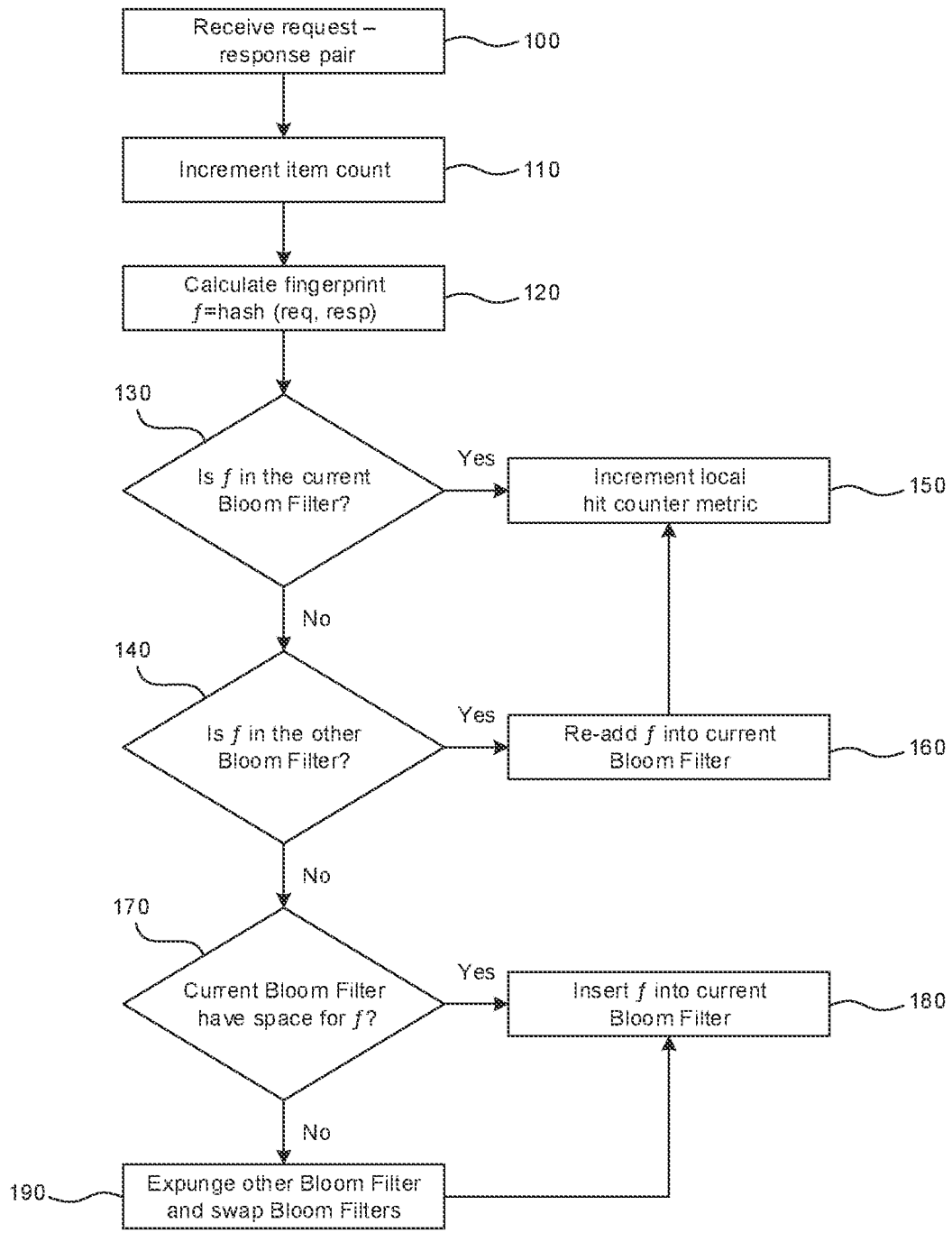
FIG. 2 is a flow chart showing metric generating operations performed by a task as part of preforming a local cacheability analysis according to an embodiment.

FIG. 2 is a flow chart showing metric generating operations performed by a task as part of preforming a local cacheability analysis according to an embodiment. In its simplest form, the local cacheability analysis requires storing fingerprints for all the requests the task has received. Upon receiving a new request and sending the appropriate response, the fingerprint of the last serving can be compared with the fingerprints of the previously served responses and a hit reported if there was a previous occurrence. As keeping track of all the fingerprints is not scalable, Bloom Filters are used to store this information. Further, in order to emulate a cache-eviction, a two-filter approach is used. In this approach, there are two Bloom Filters representing a set (instead of one) and fingerprints are inserted into one filter at a time. When the two filters are full, the contents are cleared from the filter that is not currently being filled and the contents from the other filter are swapped into the cleared filter, leaving the other filter empty and available. In this manner cache expiration is emulated, albeit half of the cache will be evicted at once.

Referring back to FIG. 2, local cacheability analysis is described in more detail. The operations depicted in the figure are performed for a bounded time and may be performed by cacheability software associated with a task, such as an instance of cacheability software running on a server performing the task. As can be seen from the figure, upon initiation of the bounded time, when a request is received by the task and served with a response, the resulting request-response pair is sent to the cacheability software (step 100). The cacheabilty software assumes that the request-response pair corresponds to a cache entry and thus an item count is incremented (step 110). Further, a fingerprint is calculated for the received request-response pair (step 120), and a determination is made as to whether the fingerprint is in a bloom filter (steps 130 and 140). More specifically, a determination is made as to whether the fingerprint is in a current bloom filter (step 130), and if the fingerprint is not in the current bloom filter a determination is made as to whether the fingerprint is in an other bloom filter (step 140). If the fingerprint is in the current bloom filter, a local hit count is incremented (step 150). If the fingerprint is in the other bloom filter, the fingerprint is added to the current bloom filter (step 160) and the local hit count is incremented (step 150). The operation of adding the fingerprint to the current bloom filter if it is in the other bloom filter acts to keep recent request-response fingerprints in the current bloom filter so that the current bloom filter and the other bloom filter simulate the least recently used (LRU) behavior of a cache.

If the fingerprint calculated in step 120 is not in the current bloom filter or the other bloom filter, a determination is made as to whether the current bloom filter has space for the fingerprint (step 170). That is, a determination is made as to whether the size of the items corresponding to the fingerprints in the current bloom filter is such that the cache portion being modeled by the current bloom filter does not have enough space for entry of data represented by the fingerprint calculated at step 120. If the current bloom filter does have space for the fingerprint, the fingerprint is added to the current bloom filter (step 180). If the current bloom filter does not have space for the fingerprint, the other bloom filter is expunged, and the contents of the current bloom filter are moved to the other bloom filter (step 190) fingerprint is added to the current bloom filter (step 180).

The operations of expunging the other bloom filter and moving the contents of the current bloom filter into the other bloom filter acts to simulate the expiration of cache entries and their attendant eviction, albeit a simulation in which half the cache expires at once in a worst case scenario.

Once the operations of FIG. 2 have been performed for the bounded time of the cacheability analysis, a local cache hit rate can be estimated. In some embodiments, the local cache hit rate may be estimated by dividing the local hit count by the item count, since the item count will equal the total number of requests for the bounded time.

It should be noted that in order to emulate a realistic caching behavior, a limit can be placed on the amount of data that can be stored in the cache through a maximum cache size parameter and the total size of the items stored in the cache can be tracked. Since the cacheability analysis utilizes cache-size based eviction, the maximum number of items in the cache is closely related to the average response size for the target task. For instance, the cache size is 100 MB and the average response size is 100 kB, the expectation is to have ~4000 items in the cache, ~500 per filter.

There is a trade-off between the amount of information stored and the accuracy of the results (i.e., the probability of false positive). The bloom filter size and the number of hash functions are configurable parameters. A user can choose a configuration with the desired probability of false positive. Moreover, since the probability of false positive will be displayed on the resulting dashboards, the users can understand how dependable the results are and further tune their configurations. In one possible implementation, a default value of a 10 kB filter with 5 hash functions is used, which provides a sub 5% error rate for up to 10 k items per task in the cache.

Figure 3:
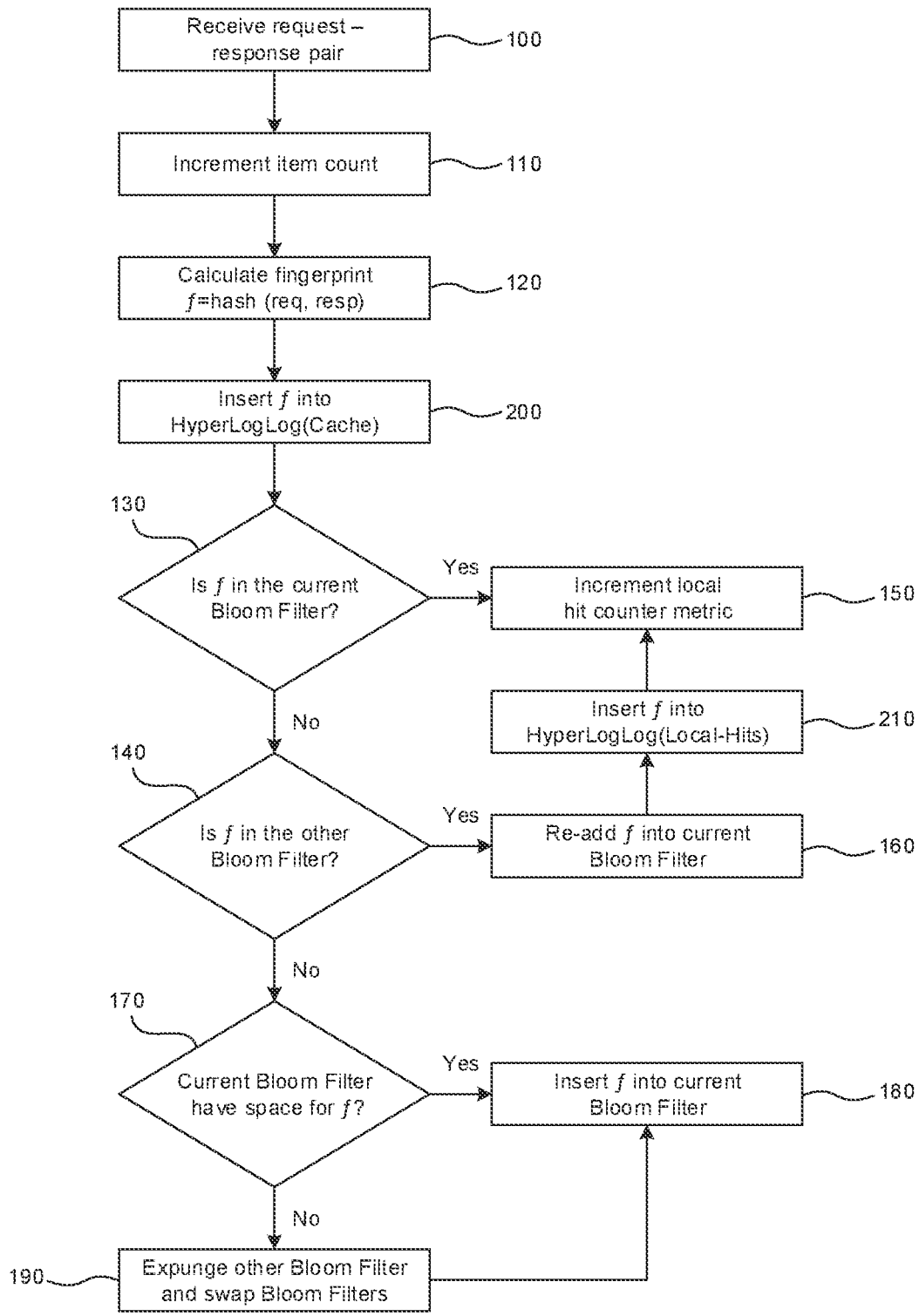
FIG. 3 is a flow chart showing metric generating operations performed by a task as part of preforming a local cacheability or distributed cacheability analysis according to an embodiment.

Referring now to FIG. 3, the figure shows a flow chart depicting metric generating operations performed by a task as part of preforming a local cacheability or distributed cacheability analysis according to an embodiment. As in the FIG. 2 embodiment, the operations of FIG. 3 are performed for a bounded time. As can be seen from FIG. 3, the operations depicted in FIG. 3 include the operations of FIG. 2 (steps 100-190) and two additional operations (steps 200 and 210). In step 200, the fingerprint calculated in step 120 is added to a storage of all fingerprints that have been calculated during the bounded time, the storage referred to as "HyperLogLog(Cache)." Notably, the HyperLogLog (Cache) storage includes all fingerprints that are calculated, and thus stores a set with the elements being the calculated fingerprints.

In step 210, any fingerprint that is added back into the current bloom filter in step 160 is added to a storage of all fingerprints that have been added back into the current bloom filter during the bounded time, the storage referred to as "HyperLogLog(Local-Hits)." Notably, the HyperLogLog (Local-Hits) storage stores a set with the elements being the fingerprints added back to the current bloom filter. Also notable is that a fingerprint is not added to HyperLogLog (Local-Hits) if it is determined to be in the current bloom filter in step 130, as such fingerprint may or may not correspond to a local hit. Thus, HyperLogLog(Local-Hits) approximates all local hit fingerprints.

The HyperLogLog(Cache) and HyperLogLog(Local-Hits) are each generated for analysis by a hyperloglog algorithm. For HyperLogLog(Cache), the hyperloglog algorithm estimates the cardinality of the fingerprints in the HyperLogLog(Cache), i.e., the number of distinct calculated fingerprints. For HyperLogLog(Local-Hits), the hyperloglog algorithm estimates the cardinality of the fingerprints in the HyperLogLog(Local-Hits), i.e., the number of distinct fingerprints corresponding to local hits. The cardinality of the calculated fingerprints and the cardinality of fingerprints corresponding to local hits may be used to calculate a number of distributed cache hits during the bounded time.

Prior describing how the metrics generated in FIG. 3 are used, the methodology for determining distributed cache hits is described more generally. In this regard, consider the example below of three tasks with the cache contents for each task at a given time already known. In this example, the first task has elements A and B in its cache, the second task has B and C, and so on.

$$\underset{m\ \ m}{\overset{Task\ 1}{\text{Cache} = \{A, B\}}} \quad \underset{h\ \ m}{\overset{Task\ 2}{\text{Cache} = \{B, C\}}} \quad \underset{h\ \ h\ \ h}{\overset{Task\ 3}{\text{Cache} = \{A, B, C\}}}$$

Assuming that all the items need to be at least fetched once from the source, one can visualize the potential hit rate through considering each element one by one and compare it with the previously seen items. For instance, proceeding from left to right, the first element is A, and this is the first time the element is observed, so this would be a miss, the next one, B, similarly is going to be a miss. However, the third item is also a B and since this item was seen before, this would be a hit. As the analysis is continued, there are 4 additional hits.

This essentially assumes that there is a reach out to the source (i.e., causing a miss) exactly once for each unique item and all the other occurrences are hits. Then, the following formula is used to calculate the number of hits:

$$DS = \sum_i |C_i| - \left| \bigcup_i C_i \right| \quad (1)$$

where DS is the expected number of distributed hits and C_i is the cache set for task i Notice that this formula assumes that, for all elements in the superset of caches, there was exactly one cache miss. This might not be true in reality as the tasks might be actually serving from their local caches, hence this value might have been already accounted for in the local analysis.

In order to compensate for the local cache hits, it is assumed for the time being that each task also stores and relays the set of local hits. This way, one can find if a specific item is served from the local caches across all the tasks, in which case there would not be a need to account for additional hits. For instance, if it is assumed that task 1 and task 3 served item A (and all local occurrences of item A) from their local caches, then there is no need to consider element A in the analysis. If there is at least one A that is not served from local cache, the analysis still applies.

$$\underset{m\ \ m}{\overset{Task\ 1}{\text{Cache} = \{A, B\}}} \quad \underset{h\ \ m}{\overset{Task\ 2}{\text{Cache} = \{B, C\}}} \quad \underset{h\ \ h\ \ h}{\overset{Task\ 3}{\text{Cache} = \{A, B, C\}}}$$

$$LH = \{A\} \qquad \qquad \qquad LH = \{A\}$$

If the local hits are factored in, the result is the following formula:

$$DS = \sum_i |C_i| - \left| \bigcup_i C_i \right| - \left( \sum_i |LH_i| - \left| \bigcup_i LH_i \right| \right) \quad (2)$$

where LH_i is the set of all-local-hits for task i (i.e., these items were not even fetched once during this cycle). Applying this formula to the example, the new expected number of hits is now 3.

The above analysis assumes a way to represent sets, with support for cardinality and union operations. One way to handle such analysis is to require transfer of the cache and miss sets per task to a centralized location and execution of these operations through a pipeline. However, such centralized calculations may be avoided, and the analysis can be performed on the basis of already available data collection and processing mechanisms.

In the design of this disclosure, each task exposes two hyperloglog streams, one for the cache contents (i.e., C_i sets above) and one for all-local-hits (i.e., LH_i sets above). Then, the cardinality of each set is simply estimated by applying the hyperloglog cardinality estimation.

Having described the methodology for determining distributed cache hits in general, a description of applying the methodology to the FIG. 3 metrics is provided. Referring to formula (2), the four terms of the formula for the bounded time, as the formula is read from left to right, may be estimated respectively by (i) adding together the number of elements in the HyperLogLog(Cache) storage (see step 200) for the tasks, (ii) applying hyperloglog to the aggregate of the HyperLogLog(Cache) data generated for the tasks, (iii) adding together the number of elements in the HyperLogLog (Local-Hits) storage (see step 210) for the tasks, and (iv) applying hyperloglog to the aggregate of the HyperLogLog (Local-Hits) data generated for the tasks.

Once the number of distributed hits for the bounded time is estimated by formula (2), the distributed hit rate is computed by dividing the estimated number of distributed hits (DS) by the sum of the item counts for the tasks.

Figure 4:
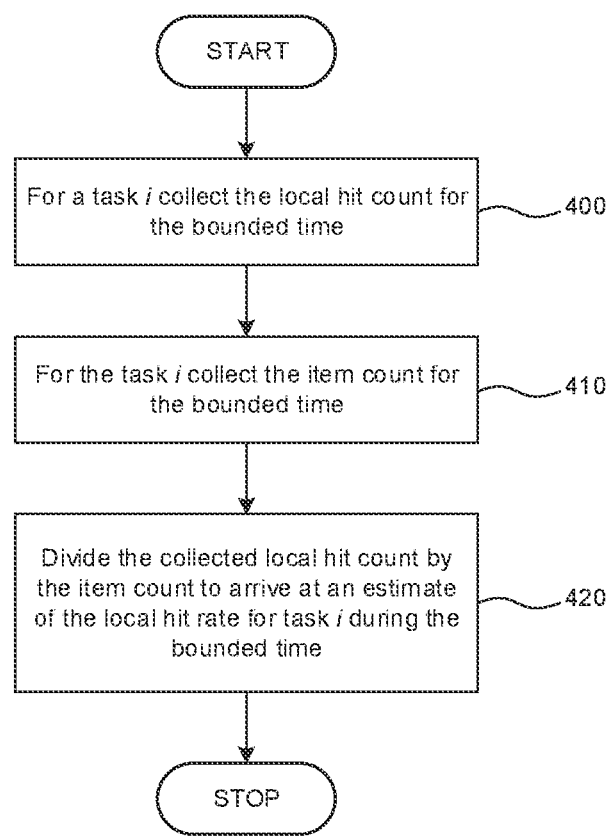
FIG. 4 is a flow chart showing how metrics generated according to the FIG. 2 or 3 embodiments may be used to estimate a local cache hit rate.

FIG. 4 is a flow chart showing how metrics generated according to the FIG. 2 or 3 embodiments may be used to estimate a local cache hit rate. To estimate a local cache hit rate for a task i, collect the local hit count for the task i during the bounded time (step 400) and collect the item count for the task i during the bounded time (step 410), and then divide the collected local hit count by the collected item count to arrive at an estimate of the local hit rate for task i during the bounded time (step 420).

Figure 5:
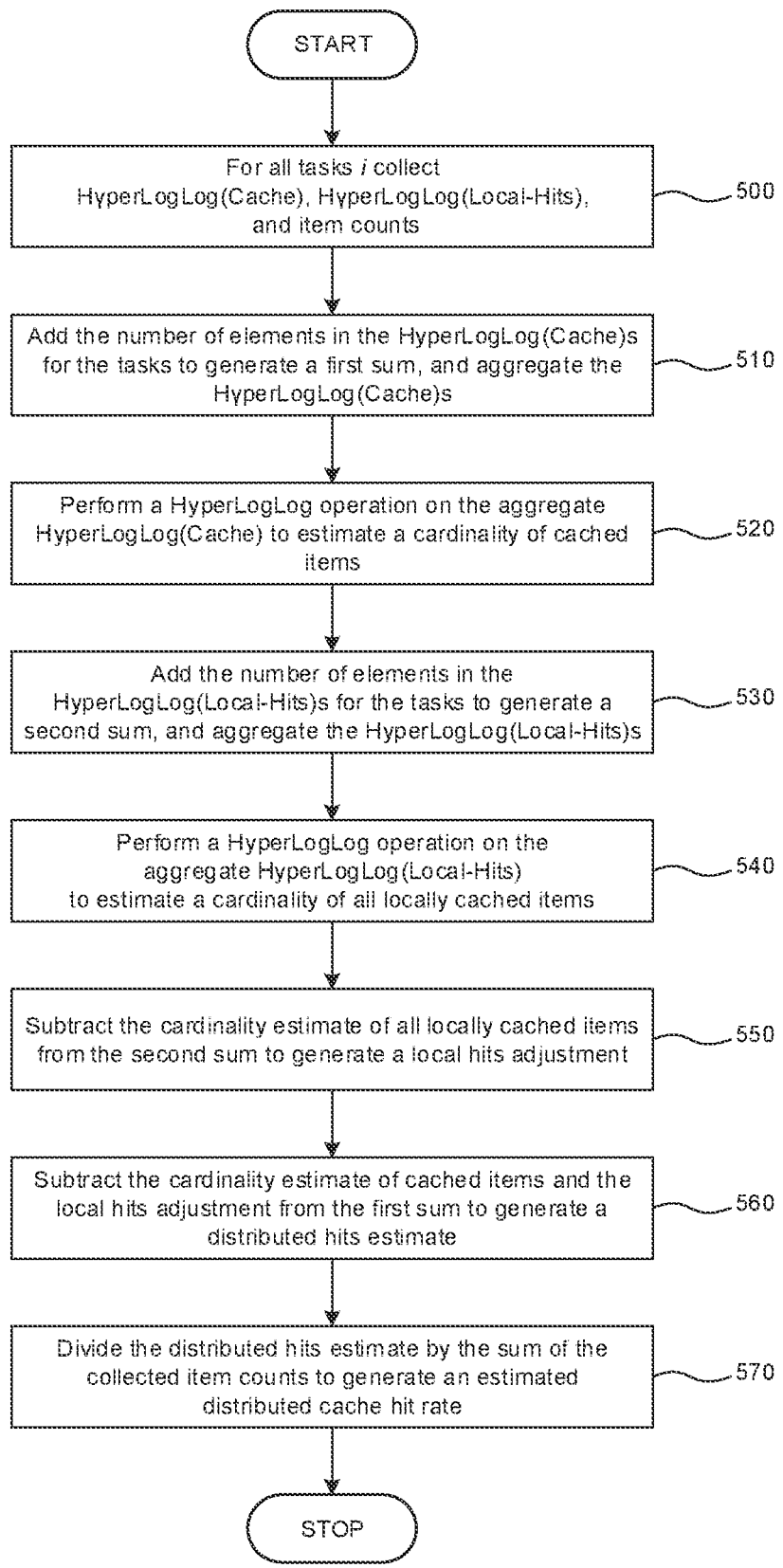
FIG. 5 is a flow chart showing how metrics generated according to the FIG. 3 embodiment may be used to estimate a distributed cache hit rate.

FIG. 5 is a flow chart showing how metrics generated according to the FIG. 3 embodiment may be used to estimate a distributed cache hit rate. To estimate a distributed cache hit rate for i tasks, first collect for the i tasks the HyperLogLog(Cache)s, the HyperLogLog(Local-Hits)s, and the item counts (step 500). Then, add the number of elements in the HyperLogLog(Cache)s for the tasks to generate a first sum and aggregate the HyperLogLog(Cache)s (step 510), and perform a hyperloglog operation on the aggregate HyperLogLog(Cache) to estimate a cardinality of cached items (520). Next, add the number of elements in the HyperLogLog(Local-Hits)s for the tasks to generate a second sum and aggregate the HyperLogLog(Local-Hits)s (step 530), and perform a hyperloglog operation on the aggregate HyperLogLog(Local-Hits) to estimate a cardinality of all locally cached items (step 540). And subtract the cardinality estimate of all locally cached items from the second sum to generate a local hits adjustment (step 550), subtract the cardinality estimate of cached items and the local hits adjustment from the first sum to generate a distributed hits estimate (step 560), and divide the distributed hits estimate by the sum of the collected item counts to generate an estimated distributed cache hit rate (step 570).

Figure 6:
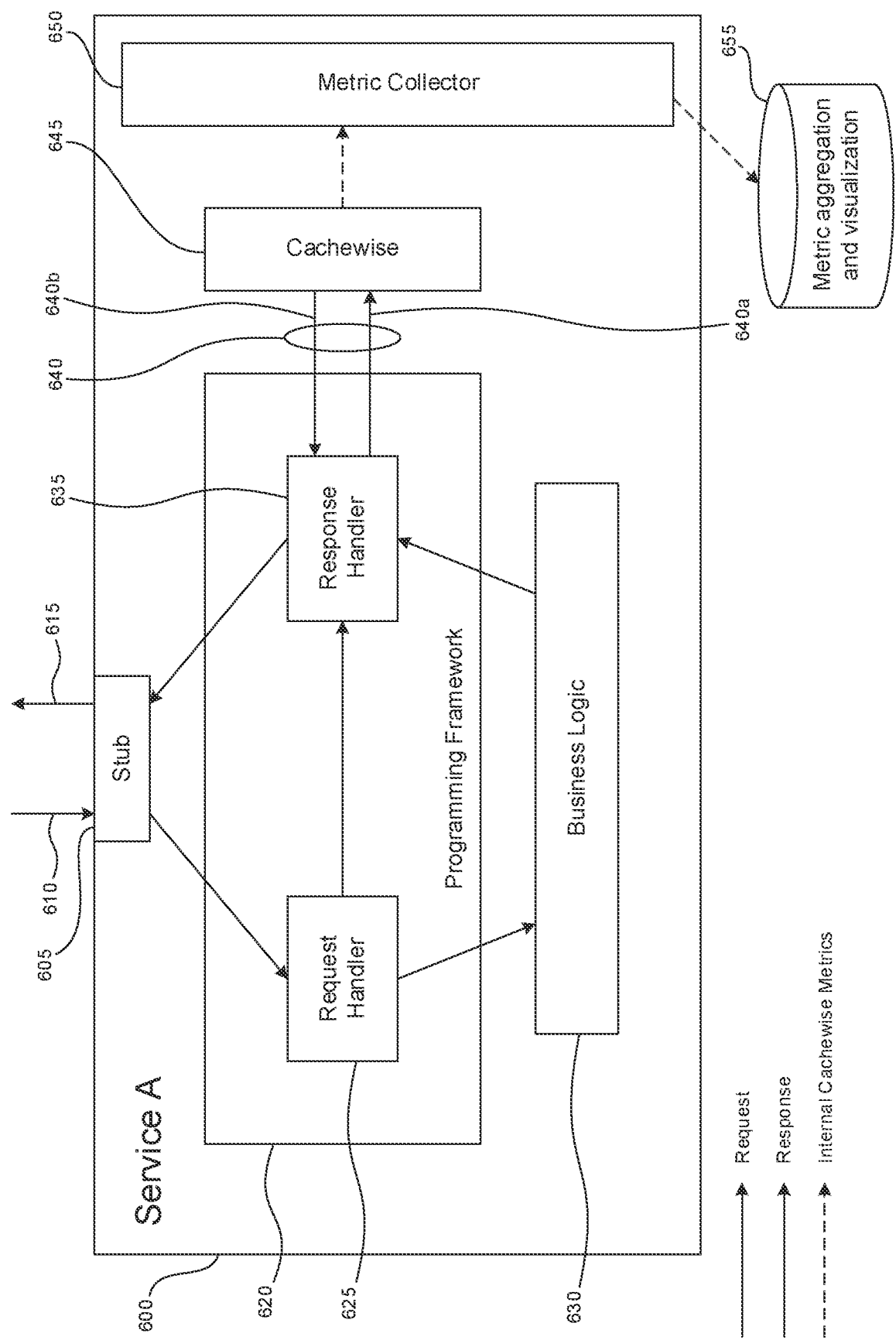
FIG. 6 is a block diagram of a system for implementing the embodiments of FIGS. 2-5.

FIG. 6 is a block diagram of a system for implementing the embodiments of FIGS. 2-5. Depicted in FIG. 6 is a single task 600. The task 600 may be implemented, for example, by a single server computer, and therefore for purposes of concise explanation FIG. 6 will be described in the context of element 600 representing both a single server computer and a single task. Further, the elements internal to task 600 are described as software elements, however it should be noted that such elements may alternatively be in the form or hardware, or in the form of a combination of hardware and software.

As can be seen from FIG. 6, the task 600 includes a stub 605 that serves as an interface or port. The stub may receive requests 610 from a network or another computing environment and may provide responses 615 to the network or other computing environment. The requests 610 received by the stub 605 are passed to a programming framework 620, and more specifically to a request handler 625 of the programming framework 620. The request handler 625 is operable to generate information used for responding to the requests 610 and may further interface with business logic 630 of the task 600 to generate information used for responding to the requests 610. The request handler 625 and/or business logic 630 may pass information used for responding to the requests 610 to a response hander 635 of the programming framework 620.

The response handler 635 generates responses 615 to respective requests 610 and passes such responses to the stub 605. In addition, the response handler 635 passes each request-response pair 640, including request 640a and response 640b to an instance of cacheability software 645 that is associated with task 600 (e.g., running on server 600), the request 640a having been passed to the response handler 635 by the request handler 625.

Receipt of the request-response pair 640 by the cacheability software 645 is reflected in FIGS. 2 and/or 3 as step 100. Following receipt of the request-response pair 640, the cacheability software 645 may execute the remaining steps of FIG. 2 or 3. As such, the cacheability software 645 may generate metrics as described in connection with FIGS. 2 and 3. For example, if the cacheability software 645 executes the operations of FIG. 3, it may generate for task 600 for a bounded time the metrics: an item count, HyperLogLog(Cache), a local hit count, and HyperLogLog(Local-Hits). Further, the generated metrics may be passed to a metric collector 650 that is part of task 600, and the metric collector 650 may, in turn, pass the collected metrics to a metric aggregation and visualization element 655.

Upon receipt of the metrics by element 655, element 655 may execute, by way of example, the operations depicted in either FIG. 4 or FIG. 5. In the case of executing the operations of FIG. 4, the element 655 does not need to perform aggregation as the element 655 will receive only local metrics, i.e., the local hit count for task 600 and the item count for task 600 and compute an estimate of the local hit rate for task 600 based on the received metrics. By contrast, in the case of executing the operations of FIG. 5, the element 655 needs to perform aggregation as the element 655 needs to (i) add together the item counts for all tasks under consideration, (ii) aggregate of the HyperLogLog (Cache) data for the tasks, (iii) add together the local hit counts for the tasks, and (iv) aggregate the HyperLogLog (Local-Hits) data for the tasks; and then compute an estimate of the distributed cache hit rate based on the aggregate data.

Notably, the element 655 provides for visualization of cacheability data. In this regard, it is envisioned that data presented on a display of element 655 may include:

Expected local hit rate for a task if an in-memory cache is to be deployed for the task Expected probability of false positive for local hit rate Number of items in the local cache Total size of items in the local cache Expected total (local+distributed) hit rate for the task. Default view may be per-location or per-datacenter as distributed caches may be location-wide or datacenter-wide but not global Expected error rate for the distributed hit rate (constant per configuration) These measurements will let the service owners understand how cacheable their task is, and also report on the error rates which can be used to refine the configurations. As an example, in case of high hit rate and high probability of error, a suggestion is to increase the size of the bloom filter.

It should be further noted that in one possible configuration, the metric aggregation and visualization element 655 may take the form of a client computer including a display and coupled to a multiple of tasks, including task 600, via the Internet.

Embodiments of the present technology include, but are not restricted to, the following.

(1) A method for estimating one or more cache hit rates, including receiving a request-response pair; incrementing a cached item count; calculating a fingerprint for the request-response pair; determining whether the fingerprint is a member of a bloom filter, and when the fingerprint is a member of the bloom filter incrementing a local hit count; repeating the steps of receiving, incrementing, calculating, and determining for a cacheability analysis period; and estimating a local cache hit rate based on the item count and the local hit count.

(2) The method according to (1), wherein the step of determining includes whether the fingerprint is a member of a current bloom filter or an other bloom filter, and wherein the method further includes when the fingerprint is not a member of the current bloom filter and is a member of the other bloom filter, making the fingerprint a member of the current bloom filter (3) The method according to (2), further including when the fingerprint is not a member of the fingerprint is not a member of the current bloom filter and not a member of the other bloom filter, determining whether there is space for the fingerprint in current bloom filter, when there is space for the fingerprint in current bloom filter, making the fingerprint a member of the current bloom filter, and when there is not space for the fingerprint in current bloom filter, clearing the other bloom filter, moving the contents of the current bloom filter into the other bloom filter, and making the fingerprint a member of the current bloom filter.

(4) The method according to (1), wherein the step of calculating a fingerprint for the request-response pair includes performing a hash operation on data that uniquely identifies the request-response pair.

(5) The method according to (4), where in the fingerprint is a binary hash code that uniquely identifies the fingerprint.

(6) A method for estimating one or more cache hit rates, including receiving a request-response pair; incrementing an item count; calculating a fingerprint for the request-response pair and storing the fingerprint in a first storage; determining whether the fingerprint is a member of a current bloom filter, when the fingerprint is a member of the current bloom filter, incrementing a local hit count, and when the fingerprint is not a member of the current bloom filter, determining whether the fingerprint is a member of an other bloom filter, when the fingerprint is a member of the other bloom filter, adding the fingerprint to the current bloom filter, and adding the fingerprint to a second storage, and when the fingerprint is not a member of the other bloom filter determining whether the current bloom filter has space for the fingerprint, when the current bloom filter has space for the fingerprint adding the fingerprint into the current bloom filter, and when the current bloom filter does not have space for the fingerprint, clearing the other bloom filter and then moving the contents of the current bloom filter to the other bloom filter; repeating the steps of receiving, incrementing, calculating, and determining for a cacheability analysis period; estimating a cache hit rate based on at least the item count.

(7) The method according to (6), wherein the step of estimating a cache hit rate includes estimating a local cache hit rate based on the item count and the local hit count.

(8) The method according to (6), wherein the step of estimating a cache hit rate includes estimating a distributed cache hit rate based on the item count, the contents of the first storage, and the contents of the second storage.

(9) The method according to (8), wherein the distributed cache hit rate corresponds to a distributed cache serving i tasks, where i is an integer greater than or equal to two, the item count equals a number of request-response pairs received at a first task, the contents of the first storage are fingerprints corresponding to the request-response pairs received at the first task, and the contents of the second storage are approximately the fingerprints corresponding to the local cache hits for the first task.

(10) The method according to (9), wherein the step of estimating a distributed cache hit rate includes calculating a number of fingerprints in the first storage and including the number of fingerprints in the first storage in a first sum, which indicates the number of request-response pairs received for the i tasks, calculating a number of fingerprints in the second storage and including the number of fingerprints in the second storage in a second sum, which indicates the number fingerprints corresponding to local hits for the i tasks, including the contents of the first storage in an aggregate of first storage contents for the i tasks, including the contents of the second storage in an aggregate of second storage contents for the i tasks, performing a hyperloglog operation on the aggregate of first storage contents to generate an estimated cardinality for the aggregate of first storage contents, performing hyperloglog operation on the aggregate of second storage contents to generate an estimated cardinality for the aggregate of second storage contents, subtracting the estimated cardinality for the aggregate of second storage contents from the second sum to generate a local hits adjustment, subtracting the local hits adjustment and the estimated cardinality for the aggregate of first storage contents from the first sum to generate a distributed hit count for the i tasks, and estimating the distributed cache hit rate based on a sum of item counts for the i tasks and the distributed hit count.

(11) The method according to (6), wherein the step of calculating a fingerprint for the request-response pair includes performing a hash operation on data that uniquely identifies the request-response pair.

(12) The method according to (11), where in the fingerprint is a binary hash code that uniquely identifies the fingerprint.

(13) A system for providing an estimate of one or more cache hit rates, including a device for receiving metrics from i tasks, wherein i is an integer greater than or equal to one, and using the metrics to calculate an estimate of one or more cache hit rates.

(14) The system according to (13), further including a display operable to display the estimate of one for more cache hit rates.

(15) The system according to (13), wherein the metrics comprise an item count for one of the tasks and fingerprints of request-response pairs received at the one of the tasks.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A method for estimating one or more cache hit rates, comprising:
   receiving a request-response pair;
   incrementing a cached item count;
   calculating a fingerprint for the request-response pair;
   determining whether the fingerprint is a member of a bloom filter, and when the fingerprint is a member of the bloom filter incrementing a local hit count;
   repeating the steps of receiving, incrementing, calculating, and determining for a cacheability analysis period; and
   estimating a local cache hit rate based on the item count and the local hit count.

2. The method according to claim 1, wherein the step of determining comprises whether the fingerprint is a member of a current bloom filter or an other bloom filter, and wherein the method further comprises
   when the fingerprint is not a member of the current bloom filter and is a member of the other bloom filter, making the fingerprint a member of the current bloom filter.

3. The method according to claim 2, further comprising:
   when the fingerprint is not a member of the fingerprint is not a member of the current bloom filter and not a member of the other bloom filter, determining whether there is space for the fingerprint in current bloom filter,
   when there is space for the fingerprint in current bloom filter, making the fingerprint a member of the current bloom filter, and
   when there is not space for the fingerprint in current bloom filter, clearing the other bloom filter, moving the contents of the current bloom filter into the other bloom filter, and making the fingerprint a member of the current bloom filter.

4. The method according to claim 1, wherein the step of calculating a fingerprint for the request-response pair comprises performing a hash operation on data that uniquely identifies the request-response pair.

5. The method according to claim 4, where in the fingerprint is a binary hash code that uniquely identifies the fingerprint.

6. A method for estimating one or more cache hit rates, comprising:
   receiving a request-response pair;
   incrementing an item count;
   calculating a fingerprint for the request-response pair and storing the fingerprint in a first storage;
   determining whether the fingerprint is a member of a current bloom filter,
     when the fingerprint is a member of the current bloom filter, incrementing a local hit count, and
     when the fingerprint is not a member of the current bloom filter, determining whether the fingerprint is a member of an other bloom filter, when the fingerprint is a member of the other bloom filter, adding the fingerprint to the current bloom filter, and adding the fingerprint to a second storage, and when the fingerprint is not a member of the other bloom filter determining whether the current bloom filter has space for the fingerprint, when the current bloom filter has space for the fingerprint adding the fingerprint into the current bloom filter, and when the current bloom filter does not have space for the fingerprint, clearing the other bloom filter and then moving the contents of the current bloom filter to the other bloom filter;

repeating the steps of receiving, incrementing, calculating, and determining for a cacheability analysis period;

estimating a cache hit rate based on at least the item count.

7. The method according to claim 6, wherein the step of estimating a cache hit rate comprises estimating a local cache hit rate based on the item count and the local hit count.

8. The method according to claim 6, wherein the step of estimating a cache hit rate comprises estimating a distributed cache hit rate based on the item count, the contents of the first storage, and the contents of the second storage.

9. The method according to claim 8, wherein the distributed cache hit rate corresponds to a distributed cache serving i tasks, where i is an integer greater than or equal to two, the item count equals a number of request-response pairs received at a first task, the contents of the first storage are fingerprints corresponding to the request-response pairs received at the first task, and the contents of the second storage are approximately the fingerprints corresponding to the local cache hits for the first task.

10. The method according to claim 9, wherein the step of estimating a distributed cache hit rate comprises:

calculating a number of fingerprints in the first storage and including the number of fingerprints in the first storage in a first sum, which indicates the number of request-response pairs received for the i tasks, calculating a number of fingerprints in the second storage and including the number of fingerprints in the second storage in a second sum, which indicates the number fingerprints corresponding to local hits for the i tasks, including the contents of the first storage in an aggregate of first storage contents for the i tasks, including the contents of the second storage in an aggregate of second storage contents for the i tasks, performing a hyperloglog operation on the aggregate of first storage contents to generate an estimated cardinality for the aggregate of first storage contents, performing hyperloglog operation on the aggregate of second storage contents to generate an estimated cardinality for the aggregate of second storage contents, subtracting the estimated cardinality for the aggregate of second storage contents from the second sum to generate a local hits adjustment, subtracting the local hits adjustment and the estimated cardinality for the aggregate of first storage contents from the first sum to generate a distributed hit count for the i tasks, and estimating the distributed cache hit rate based on a sum of item counts for the i tasks and the distributed hit count.

11. The method according to claim 6, wherein the step of calculating a fingerprint for the request-response pair comprises performing a hash operation on data that uniquely identifies the request-response pair.

12. The method according to claim 11, where in the fingerprint is a binary hash code that uniquely identifies the fingerprint.

* * * * *